United States Patent
Uozaki et al.

(10) Patent No.: US 8,388,144 B2
(45) Date of Patent: Mar. 5, 2013

(54) PROJECTION IMAGE DISPLAY DEVICE

(75) Inventors: Satoshi Uozaki, Tokyo (JP); Toshimitsu Iwai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 266 days.

(21) Appl. No.: 13/024,092

(22) Filed: Feb. 9, 2011

(65) Prior Publication Data

US 2011/0211172 A1  Sep. 1, 2011

(30) Foreign Application Priority Data

Mar. 1, 2010  (JP) .................................. 2010-043958

(51) Int. Cl.
  *G03B 21/16*  (2006.01)
(52) U.S. Cl. .......................................... 353/57
(58) Field of Classification Search .............. 353/52–57; 15/412
  See application file for complete search history.

(56) References Cited

U.S. PATENT DOCUMENTS

| 7,427,307 | B2 * | 9/2008 | Fujiyoshi et al. | 55/429 |
| 7,437,798 | B2 * | 10/2008 | Zhang | 15/412 |
| 2010/0107671 | A1 | 5/2010 | Okada et al. | |

FOREIGN PATENT DOCUMENTS

| CN | 101576702 A | 11/2009 |
| JP | 60-171335 A | 9/1985 |
| JP | 63-130116 A | 6/1988 |
| JP | 3-213919 A | 9/1991 |
| JP | 6-59247 A | 3/1994 |
| JP | 6-074521 A | 3/1994 |
| JP | 8-152242 A | 6/1996 |
| JP | 10-200837 A | 7/1998 |
| JP | 3407576 B2 | 5/2003 |
| JP | 2007-170782 A | 7/2007 |
| JP | 2007-333365 A | 12/2007 |
| JP | 2008-57923 A | 3/2008 |
| JP | 2008-196747 A | 8/2008 |
| JP | 2008-215644 A | 9/2008 |
| JP | 2009-217105 A | 9/2009 |

* cited by examiner

*Primary Examiner* — Seung C Sohn
(74) *Attorney, Agent, or Firm* — Birch, Stewart, Kolasch & Birch, LLP

(57) ABSTRACT

The present invention provides a projection image display device capable of both minimizing a decrease in a cooling ability and simplifying maintenance of a filter. The projection image display device according to the present invention includes a filter material for filtering external air taken into a casing, a loop-shaped filter frame onto which the filter material is mounted, a drive mechanism for rotating the filter frame in a loop direction of the loop shape, and a dust removal brush to be brought into contact with the filter material while spinning at a predetermined position. The filter material is mounted onto a part of a loop-shaped surface of the filter frame. The filter material is not mounted but a ventilation part is provided in the other part of the loop-shaped surface of the filter frame.

10 Claims, 5 Drawing Sheets

F I G. 1
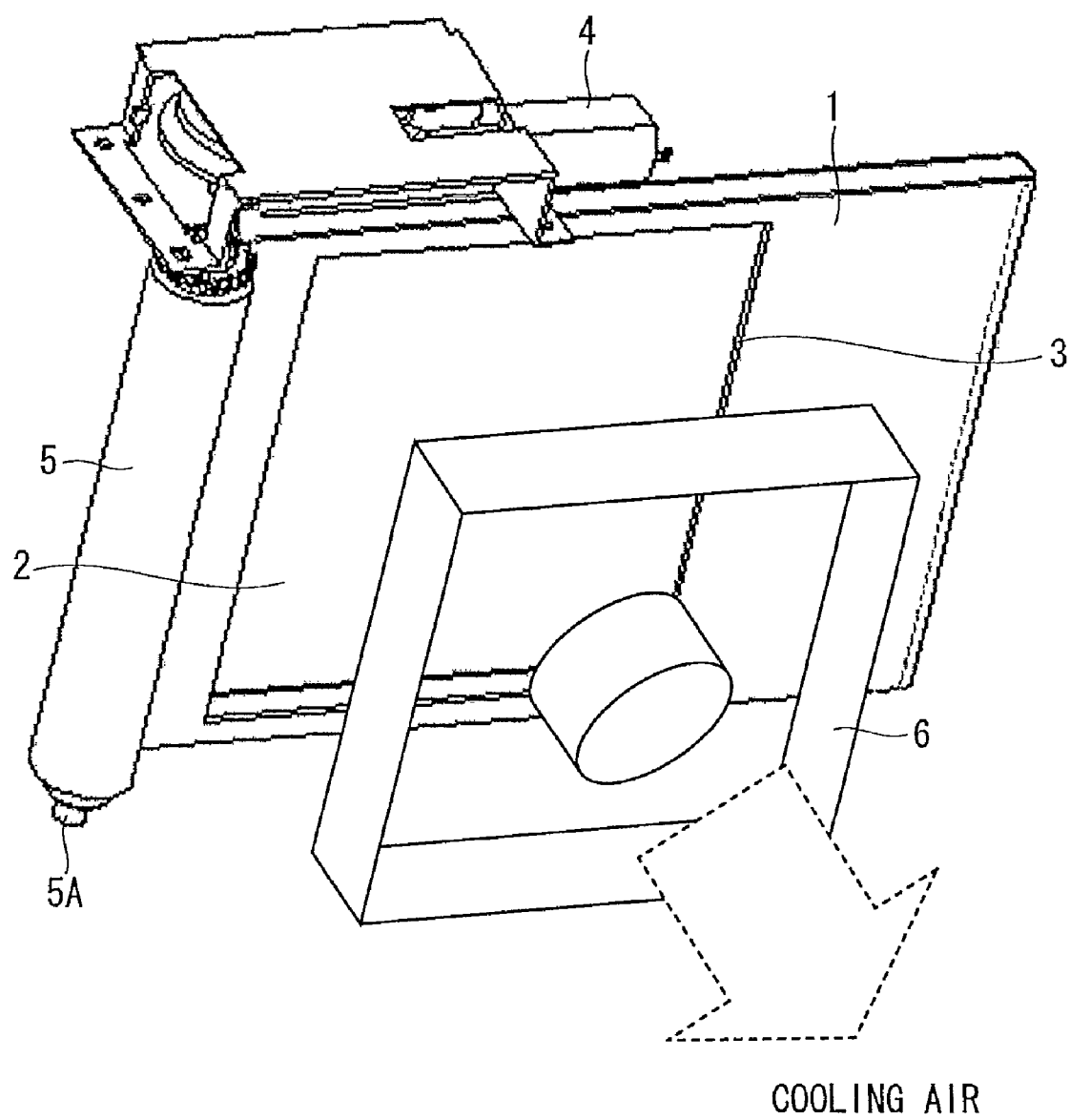
COOLING AIR

COOLING AIR

COOLING AIR

PROJECTION IMAGE DISPLAY DEVICE

BACKGROUND OF THE INVENTION

1. Field of the Invention

The present invention relates to a projection image display device having a dust-proof structure.

2. Description of the Background Art

Brightness of a projector has been improving year by year. The improved brightness creates a great advantage for a user in terms that a clear image can be seen even in a lighted environment.

Meanwhile, in accordance with the improved brightness, a heat generation amount inside the projector has been increasing. Particularly with optical parts, the more the brightness is improved, the more a heat receiving amount is increased. Thus, a cooling unit is essential for ensuring performance and safety. Conventionally, there are various methods for cooling optical parts. Among the methods, a method of taking external fresh air into a projector casing and blowing the air to the optical parts for cooling has been most frequently adopted, since the method is realizable with an inexpensive and simple structure.

However, taking the external air in means that external dust is taken in at the same time. The dust attached onto the optical parts emerges as a shadow or a bright spot in a projected image, so that quality of the image is remarkably diminished. Therefore, there is a need for removing the dust. As a measure for this, there is a general method of providing an air filter, and also, there is a technology for improving a dust-proof property (for example, refer to Japanese Patent Application Laid-Open No. 10-200837 (1998)).

The air filter itself serves as air resistance when the external air is suctioned. When the air filter is used for a long time, clogging is caused due to the dust, leading to a further decrease in a cooling ability. Therefore, there is a need for regular maintenance such as cleaning and replacement. For example, with the projector installed in a high place, performing any operation is highly troublesome. Thus, dust-proof measures to be used for a long time while avoiding the maintenance as much as possible has also been developed (for example, refer to Japanese Patent Application Laid-Open No. 06-59247 (1994)).

With the conventional inventions, it is difficult to inexpensively realize both simplicity of the maintenance and minimization of the decrease in the cooling ability.

For example, in the technology according to Japanese Patent Application Laid-Open No. 10-200837 (1998), two air filters are integrally formed, and the two air filters are simply provided. Therefore, the air resistance of suction air is increased, and there is room for improvement in terms of the decrease in the cooling ability.

In the technique according to Japanese Patent Application Laid-Open No. 06-59247 (1994), the maintenance is simplified by providing an air filter rotatably. However, in a case where the air filter is moved by using an actuator, there is a plurality of moving directions. Thus, a structure is complicated and becomes expensive as a result. Alternatively, in a case where the air filter is manually moved, an advantage of the simplicity of the maintenance is diminished.

SUMMARY OF THE INVENTION

It is an object of the present invention to provide a projection image display device capable of both minimizing a decrease in a cooling ability and simplifying maintenance of a filter.

According to the present invention, the projection image display device includes a casing in which an image display device part is arranged, a first filter material for filtering external air taken into the casing, a loop-shaped filter frame onto which the first filter material is mounted, the filter frame having first and second surfaces facing each other, a drive mechanism for rotating the filter frame in a loop direction of the loop shape, and a dust removal brush to be brought into contact with the first filter material while spinning at a predetermined position. The first filter material is mounted onto the first surface of the filter frame, and the first filter material is not mounted but a ventilation part is provided in the second surface of the filter frame.

The projection image display device according to the present invention adopts a structure in which the filter material is not mounted onto the second surface of the loop-shaped filter frame. Thus, effects of minimizing air resistance increased by installation of an air filter and suppressing the decrease in the cooling ability can be obtained.

By moving the filter frame with the drive mechanism, and cleaning the filter material with the dust removal brush while moving the filter frame, troublesomeness for a user or a serviceman to clean the filter material can be reduced to a large extent.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view showing a configuration example of a dust-proof structure used in a projection image display device according to a first preferred embodiment;

DESCRIPTION OF THE PREFERRED EMBODIMENTS

Hereinafter, the present invention will be specifically described based on the drawings showing preferred embodiments thereof.

First Preferred Embodiment

Figure 2:
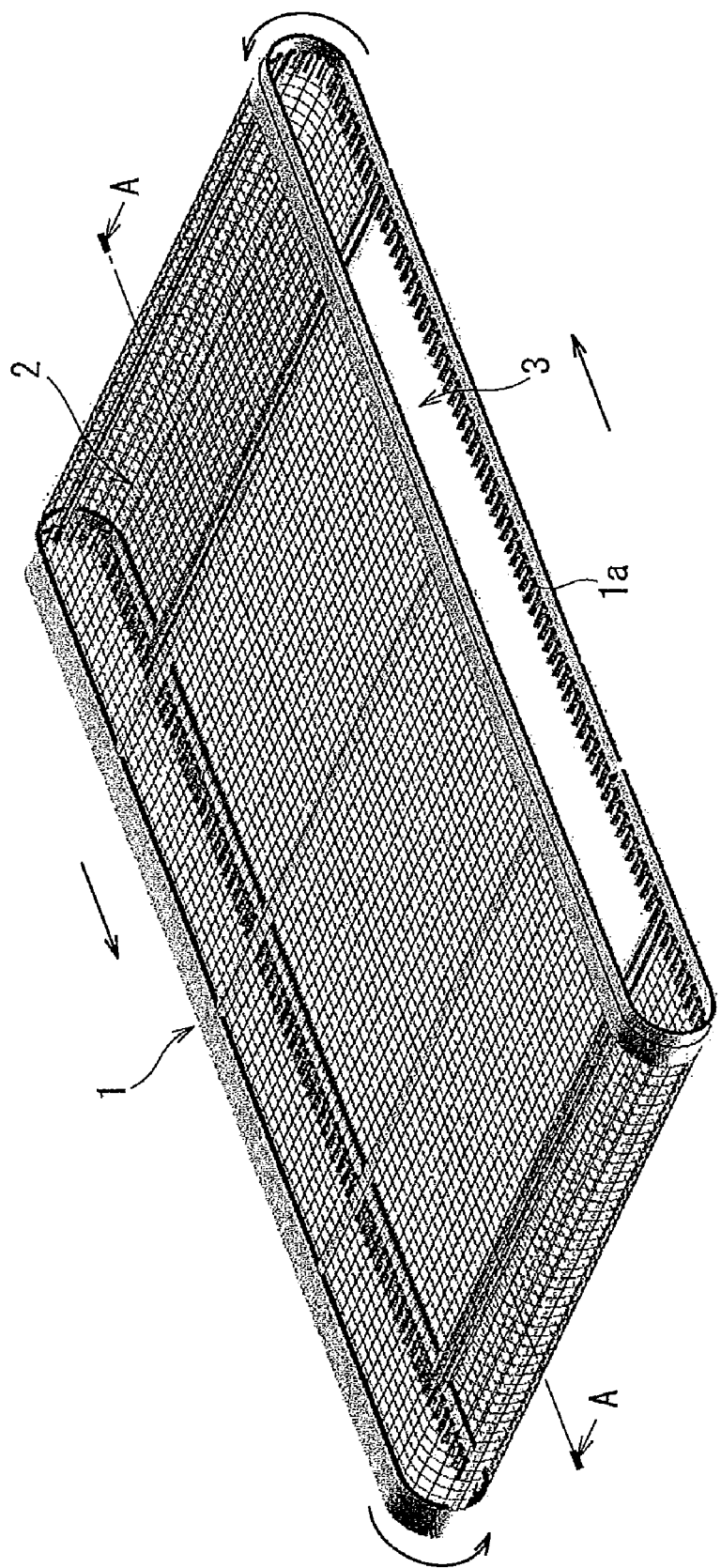
FIG. 2 is a perspective view showing configurations of a filter frame 1, a filter material 2, and a ventilation part 3.

FIG. 1 is a perspective view showing a configuration example of a dust-proof structure used in a projection image display device according to a first preferred embodiment of the present invention. FIG. 2 is a perspective view showing a configuration of a filter part provided in the dust-proof structure.

An image display device part (not shown), the dust-proof structure shown in FIG. 1, and an air sending fan 6 are arranged inside a casing (not shown) of the projection image display device.

As shown in FIG. 1, the dust-proof structure includes a filter frame 1, a drive mechanism 4, and a dust removal brush 5. As shown in FIG. 2, the filter frame 1 is formed into a hollow loop shape having first and second surfaces facing each other.

Specifically, as shown in FIG. 2, the first and second surfaces of the filter frame 1 respectively have rectangle shapes when seen in plan, and a section by line A-A of the filter frame 1 has an oval shape. A filter material (can be regarded as a first filter material) 2 is arranged on the first surface forming a part of a loop-shaped surface (refer to FIG. 2). The filter frame 1 is formed by a loop-shaped net band.

Meanwhile, in the other part of the loop-shaped surface (that is, the second surface facing the first surface), the filter material 2 is not provided but a ventilation part 3 for reducing air resistance from a suction port of the casing is provided (refer to FIGS. 1 and 2).

In a state that the filter material 2 faces the suction port of the casing, the ventilation part 3 faces the filter material 2, and further faces the air sending fan 6.

The filter material 2 filters dust in external air taken from the suction port of the casing into the casing. The air after filtering the dust passes through a hollow part of the filter frame 1, and passes through the ventilation part 3 facing the filter material 2. The air passing through the ventilation part 3 is sent by the air sending fan 6 to a cooling target (the image display device part) inside the casing as cooling air.

As shown in FIG. 1, the filter frame 1 is connected to the drive mechanism 4, and teeth 1A meshed with a gear of the drive mechanism 4 are arranged in an inner periphery of a terminal end of the filter frame 1. Mechanical power transmitted from the gear of the drive mechanism 4 is transmitted to the teeth 1A of the filter frame 1, so that the filter frame 1 is rotated only in one direction (refer to arrows in FIG. 2).

Specifically, with the configuration shown in FIG. 1, the surface forming the filter frame 1 (the surface forming the loop shape) is rotated only in one direction like a conveyor belt (refer to the arrows shown in FIG. 2).

As shown in FIG. 1, the dust removal brush 5 is arranged on the side of one edge of the filter frame 1. The dust removal brush 5 externally has a roll shape, and is fixed at a predetermined position. The dust removal brush 5 is brought into contact with the filter material 2 (the filter frame 1) while spinning on a spinning shaft 5A serving as an axis in the direction of the roll shape. When the filter material 2 (the filter frame 1) is rotated by the drive mechanism 4, the dust removal brush 5 removes the dust attached onto the filter material 2 in a part in contact with the filter material 2.

In a case where for example a raising brush is adopted as the dust removal brush 5, the removed dust can be suppressed from being attached onto the filter material 2 again. In order to easily perform dust removal by the dust removal brush 5, the filter material 2 is desirably a mesh material.

In this manner, by adopting a structure in which the filter material is not provided in the other surface of the loop-shaped filter frame 1, effects of minimizing the air resistance increased by installation of an air filter and suppressing a decrease in a cooling ability can be obtained.

By moving the filter frame 1 with the drive mechanism 4, and cleaning the filter material 2 with the dust removal brush 5 while moving the filter frame 1, troublesomeness for a user or a serviceman to clean the filter material can be reduced to a large extent.

Further, by limiting the direction of rotating the filter frame 1 by the drive mechanism 4 only to one direction, the number of parts forming the drive mechanism 4 is reduced, so that an effect of reducing cost can also be obtained.

As described above, in the invention according to the present preferred embodiment, both effects of simplifying maintenance and suppressing the decrease in the cooling ability can be inexpensively realized.

Moreover, by obtaining the mechanical power from the drive mechanism 4 for moving the filter frame 1, rotating the dust removal brush 5, and increasing friction between the filter material 2 and the dust removal brush 5, an effect of enhancing an ability for removing the dust attached onto the filter material 2 can be obtained.

Second Preferred Embodiment

Figure 3:
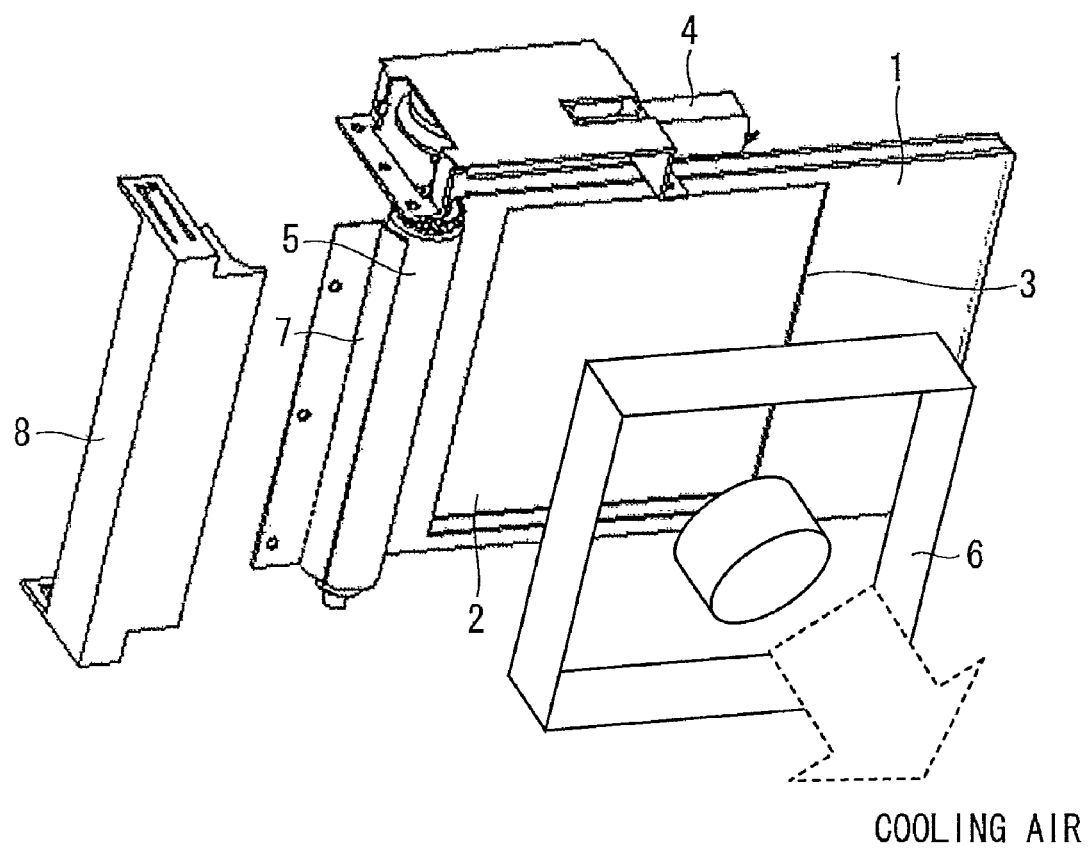
FIG. 3 is a perspective view showing a configuration example of a dust-proof structure used in a projection image display device according to a second preferred embodiment.

FIG. 3 is a perspective view showing a configuration example of a dust-proof structure used in a projection image display device according to a second preferred embodiment of the present invention.

As is apparent from comparison between FIGS. 1 and 3, in the present preferred embodiment, a detaching unit 7 and a dust box 8 are additionally formed in the configuration shown in the first preferred embodiment. The detaching unit 7 and the dust box 8 are shown in an exploded perspective view in FIG. 3.

In the invention according to the first preferred embodiment, there is a concern that the dust removed from the filter material 2 is accumulated on the dust removal brush 5 with elapse of time, so that the ability for removing the dust is decreased. Therefore, in the present preferred embodiment, the detaching unit 7 for detaching the dust attached onto the dust removal brush 5 is arranged on the side of the dust removal brush 5 where the dust removal brush is not in contact with the filter material 2.

Further, in the present preferred embodiment, the dust box 8 storing the dust detached by the detaching unit 7 is arranged.

When for example a plate shape member serving as a scraper is provided as the detaching unit 7, a unit capable of detaching the dust attached onto the dust removal brush 5 can be realized with an inexpensive and simple structure. Alternatively, when a member having a charging effect is used as the detaching unit 7, a higher detaching effect can be expected.

It should be noted that in order to store the dust detached by the detaching unit 7 in the dust box 8 without leakage, the detaching unit 7 and the dust box 8 are combined with each other.

As already described in the first preferred embodiment, the dust removal brush 5 spins on the spinning shaft 5A serving as the axis. A part of the dust removal brush 5 is in contact with the filter frame 1 as shown in FIG. 3, and the dust removal brush 5 is in contact with the detaching unit 7 on the other side of a part in contact with the filter frame 1. The detaching unit 7 is fixed at the predetermined position, and brought into contact with the entire face of the dust removal brush 5 due to rotation of the dust removal brush 5.

In the present preferred embodiment, by additionally forming the detaching unit 7, the dust attached onto the dust removal brush 5 can be removed, so that the dust can be suppressed from being attached onto the filter material 2 again. By additionally forming the dust box 8, the dust detached by the detaching unit 7 can be stored. Therefore, since the number of cleaning by the user can be reduced to a large extent, the maintenance is easily performed. When the dust box 8 is independently separable, an operation at the time of the maintenance (such as an operation of removing the dust stored in the dust box 8) is easily performed.

Third Preferred Embodiment

Figure 4:
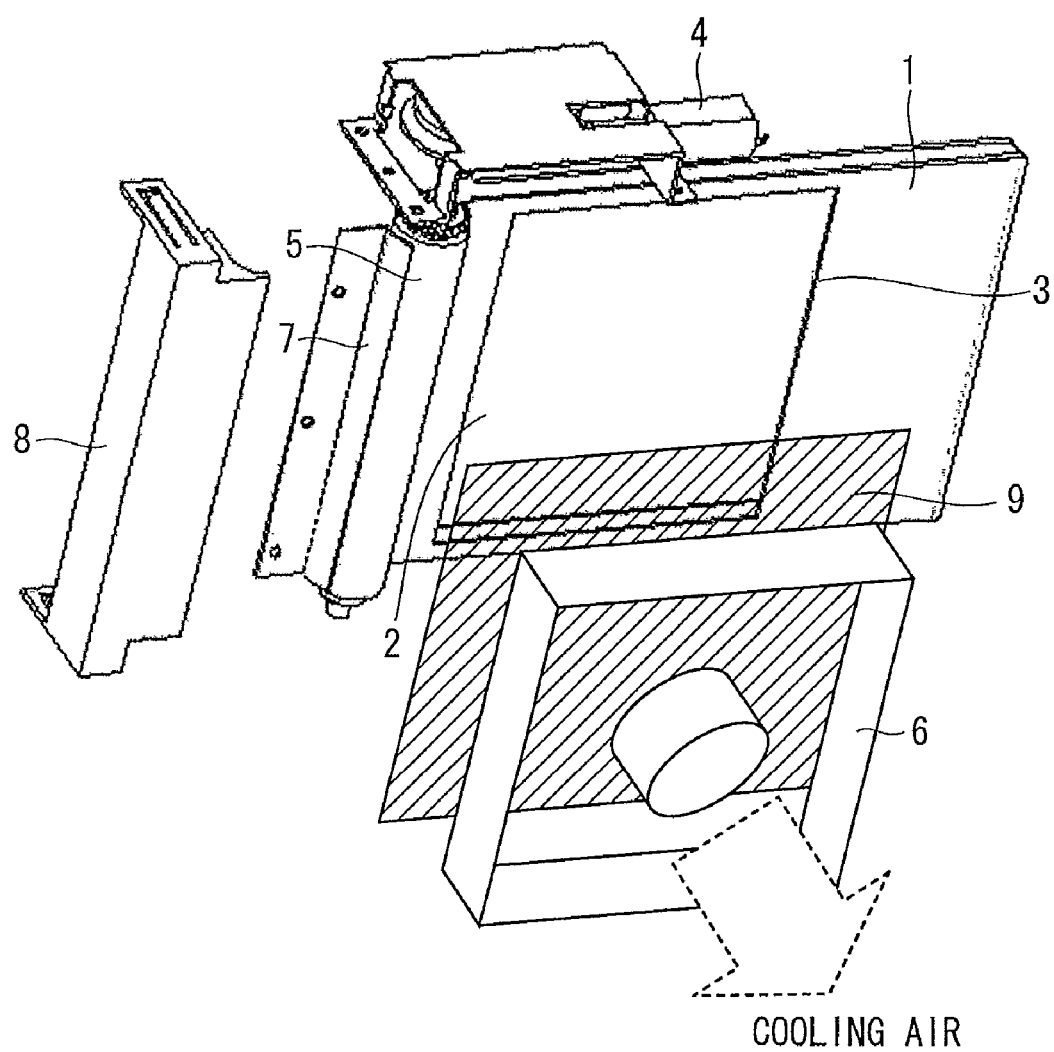
FIG. 4 is a perspective view showing a configuration example of a dust-proof structure used in a projection image display device according to a third preferred embodiment.

FIG. 4 is a perspective view showing a configuration example of a dust-proof structure used in a projection image display device according to a third preferred embodiment of the present invention.

As is apparent from comparison between FIGS. 2 and 4, in the present preferred embodiment, another filter material 9 is additionally formed in the configuration shown in the second preferred embodiment.

In the inventions according to the first and second preferred embodiments, only the filter material 2 filters the external air taken into the casing. In a case where importance is put on the dust removal by the dust removal brush 5, the mesh material is desirably used as the filter material 2. However, in general, the mesh material is inferior in a dust collecting ability compared to non-woven fabric or the like. Although the filter frame 1 is rotated by the drive mechanism 4, due to the ventilation part 3 provided on the other surface of the filter frame 1, a period of suctioning the external air without filtering is generated in the process of rotation and movement. In such a case, the dust reaching to the air sending fan 6 without filtering is blown to internal parts straightaway.

Therefore, in the present preferred embodiment, as shown in FIG. 4, a filter material (can be regarded as a second filter material) 9 is additionally provided between the rotated filter frame 1 and the air sending fan 6. The additional filter material 9 is installed and fixed at the position described above. The additional filter material 9 is a filter capable of catching smaller dust than the filter material 2.

As described above, in the invention according to the present preferred embodiment, the external air can be doubly filtered, so that dust-proof performance is improved. Further, in the invention according to the present preferred embodiment, even in a case where the external air is not filtered by the filter material 2 due to the rotation and the movement of the filter frame 1, the external air can be filtered by existence of the additional filter material 9.

It should be noted that, as described above, the additional filter material 9 is desirably a material capable of catching smaller dust than the filter material 2. In consideration with an influence on the cooling ability, that is, the air resistance of suction air, not a simply finely meshed filter is used but a charging material is more desirably used as the additional filter material 9 for absorbing the dust.

In the configuration of FIG. 4, the additional filter material 9 is added to the configuration shown in FIG. 3. However, the additional filter material 9 according to the present preferred embodiment may be additionally formed in the configuration shown in FIG. 1 as a matter of course.

Fourth Preferred Embodiment

Figure 5:
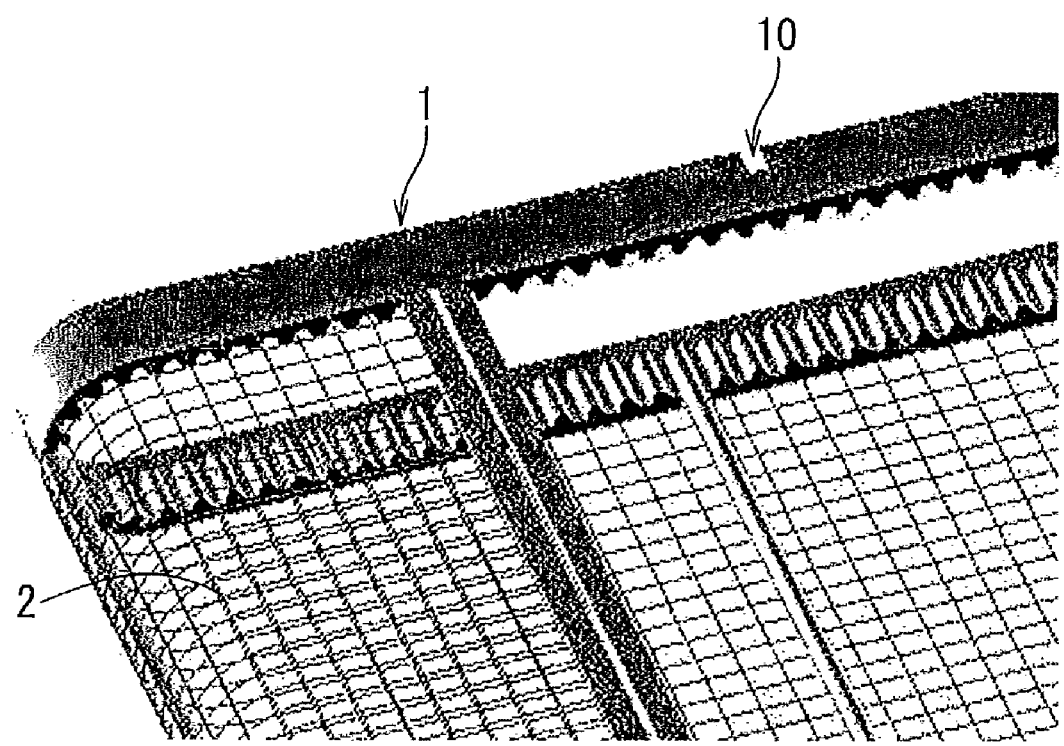
FIG. 5 is an enlarged perspective view showing a configuration of the filter frame 1 according to a fourth preferred embodiment.

FIG. 5 is a view showing a configuration example of a dust-proof structure used in a projection image display device according to a fourth preferred embodiment of the present invention. Specifically, a part of the filter frame 1 is enlarged and shown in FIG. 5.

As described in the first preferred embodiment, the filter frame 1 is rotated by the drive mechanism 4. However, in the present preferred embodiment, there is provided a position detecting unit for detecting a moving amount by the rotation and the movement and detecting that the filter frame 1 is rotated and returned to a predetermined position.

Thereby, even after the rotation and the movement, the filter frame 1 can be returned to a regular position (that is, the filter material 2 is positioned so as to face the suction port of the casing, and the ventilation part 3 is positioned between the filter material 2 and the air sending fan 6), so that displacement of the filter material 2 from the regular position after the rotation and the movement can be prevented.

For example, a cutout 10 is provided in a part of the rotated filter frame 1 as the position detecting unit. Further, a photo interrupter (can be regarded as an optical detector) for optically detecting the cutout 10 is provided as the position detecting unit. Thereby, the displacement preventing effect described above can be inexpensively obtained.

There is sometimes a case where precision in position detection cannot be maintained due to accumulation of the dust in the filter frame 1 with the position detecting unit using the optical units described above.

Therefore, a magnetic body may be arranged in a part of the filter frame 1 as the position detecting unit instead of the cutout 10. In this case, a magnetic sensor for detecting that the magnetic body is at a predetermined position is provided as the position detecting unit. Thereby, a decrease in the precision in the position detection due to the accumulation of the dust described above can be prevented.

While the invention has been shown and described in detail, the foregoing description is in all aspects illustrative and not restrictive. It is therefore understood that numerous modifications and variations can be devised without departing from the scope of the invention.

What is claimed is:

1. A projection image display device comprising:
   a casing in which an image display device part is arranged;
   a first filter material for filtering external air taken into said casing;
   a loop-shaped filter frame onto which said first filter material is mounted, the filter frame having first and second surfaces facing each other;
   a drive mechanism for rotating said filter frame in a loop direction of said loop shape; and
   a dust removal brush to be brought into contact with said first filter material while spinning at a predetermined position, wherein
   said first filter material is mounted onto said first surface of said filter frame, and
   said first filter material is not mounted but a ventilation part is provided in said second surface of said filter frame.

2. The projection image display device according to claim 1, wherein
   said filter frame is formed by a loop-shaped net band.

3. The projection image display device according to claim 1, wherein
   said drive mechanism rotates said filter frame only in one direction.

4. The projection image display device according to claim 1 further comprising:
   an air sending fan for sending the external air passing through said first filter material into said casing.

5. The projection image display device according to claim 1 further comprising:
   a detaching unit provided on a side of said dust removal brush where said dust removal brush is not in contact with said first filter material, the detaching unit for detaching dust attached onto said dust removal brush; and
   a dust box storing the dust detached by said detaching unit.

6. The projection image display device according to claim 1 further comprising:
   a second filter material provided between said first filter material and said air sending fan.

7. The projection image display device according to claim 6, wherein
said second filter material is capable of catching smaller dust than said first filter material.

8. The projection image display device according to claim 1 further comprising:
a position detecting unit for detecting that said filter frame is rotated and returned to a predetermined position.

9. The projection image display device according to claim 8, wherein
said position detecting unit includes:
a cutout provided in a part of said filter frame; and
an optical detector for optically detecting said cutout.

10. The projection image display device according to claim 8, wherein
said position detecting unit includes:
a magnetic body provided in a part of said filter frame; and
a magnetic sensor for detecting said magnetic body.

* * * * *